United States Patent [19]

Cragun et al.

[11] Patent Number: 5,771,044
[45] Date of Patent: Jun. 23, 1998

[54] METHOD AND APPARATUS FOR TOLERANCING THREE DIMENSIONAL DRAWINGS

[75] Inventors: Brian John Cragun; Randall Richard Schnier, both of Rochester, Mich.

[73] Assignee: International Business Machines Corporation, Armonk, N.Y.

[21] Appl. No.: 73,257

[22] Filed: Mar. 29, 1993

Related U.S. Application Data

[63] Continuation of Ser. No. 559,004, Jul. 27, 1990, abandoned.

[51] Int. Cl.⁶ .................................................. G06T 17/00
[52] U.S. Cl. ............................................................. 345/420
[58] Field of Search ...................... 395/119, 120, 395/124; 364/474.24; 345/419, 420, 424

[56] References Cited

U.S. PATENT DOCUMENTS

| | | | |
|---|---|---|---|
| 4,648,062 | 3/1987 | Johnson et al. | 395/155 |
| 4,736,306 | 4/1988 | Christensen et al. | 395/120 |
| 4,845,651 | 7/1989 | Aizawa et al. | 395/125 |
| 4,855,939 | 8/1989 | Fitzgerald, Jr. et al. | 395/119 |
| 4,858,150 | 8/1989 | Aizawa et al. | 395/120 |
| 4,901,253 | 2/1990 | Iwano et al. | 395/119 |
| 5,038,302 | 8/1991 | Kaufman | 395/124 |
| 5,101,475 | 3/1992 | Kaufman et al. | 395/124 |

OTHER PUBLICATIONS

IBM Technical Disclosure Bulletin, vol. 27, No. 10A, Mar. 1985 –"Three Dimensional Mechanical Part Measurement Using A Vision/Robot System".

*Primary Examiner*—Mark K. Zimmerman
*Attorney, Agent, or Firm*—Richard E. Billion; Roy W. Truelson

[57] ABSTRACT

A computer-aided design system includes a method and apparatus for defining various datums with respect to a three dimensional object shown on the CAD system. The datum is labeled on the computer screen. The computer screen includes a cursor and menus for selecting a datum and various tolerance types with respect to the datum or a face related to the datum. A tolerance type and numerical value is selected for the tolerance and is also displayed on the screen. A geometric element from the CAD model or object displayed is selected to which the tolerance applies to the selected element. Data relating to the tolerance data, the geometric element, and the datum are stored within the computer. Linkage relationships are used to relate the data stored.

17 Claims, 19 Drawing Sheets

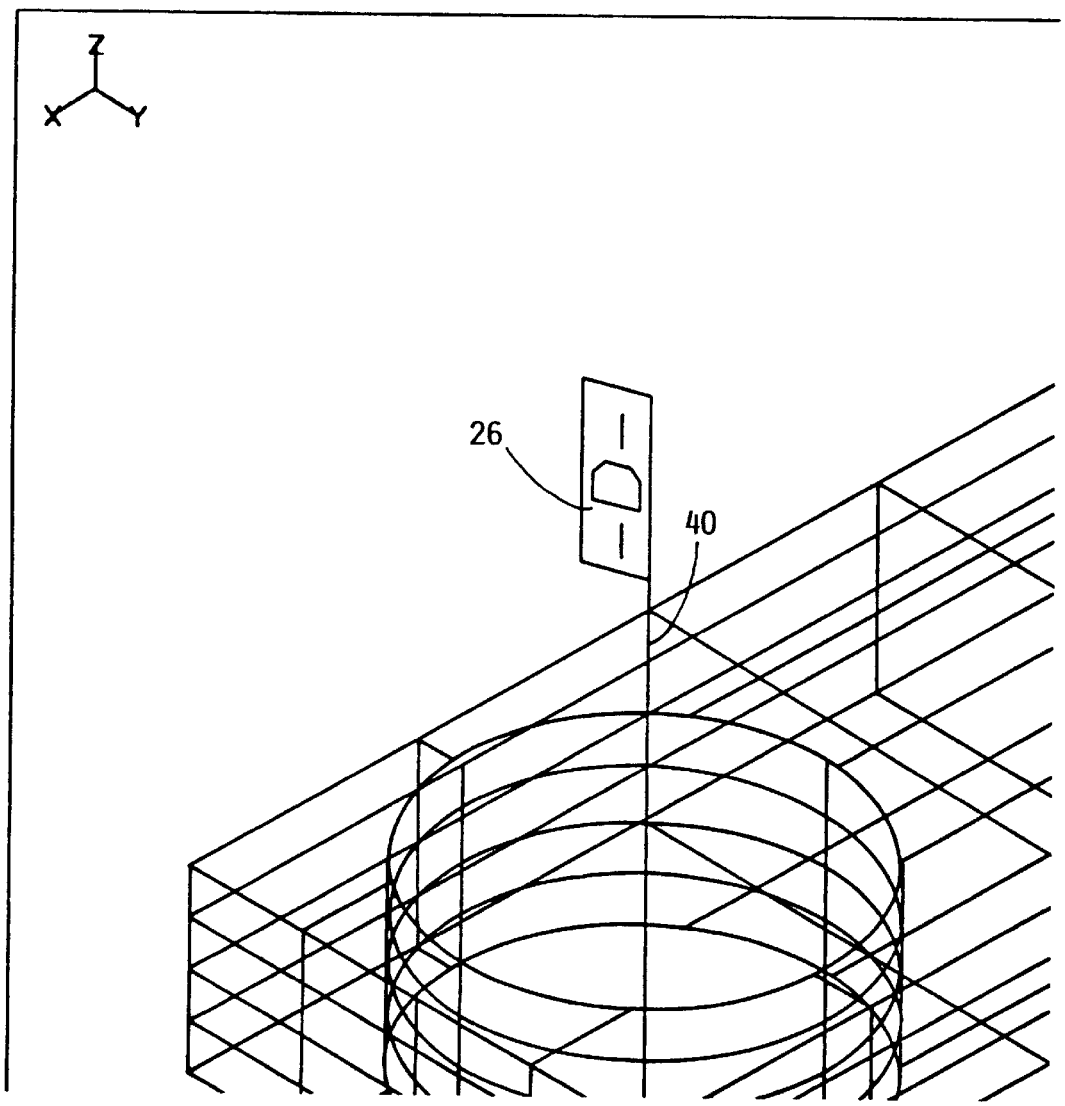
FIG. 3A I

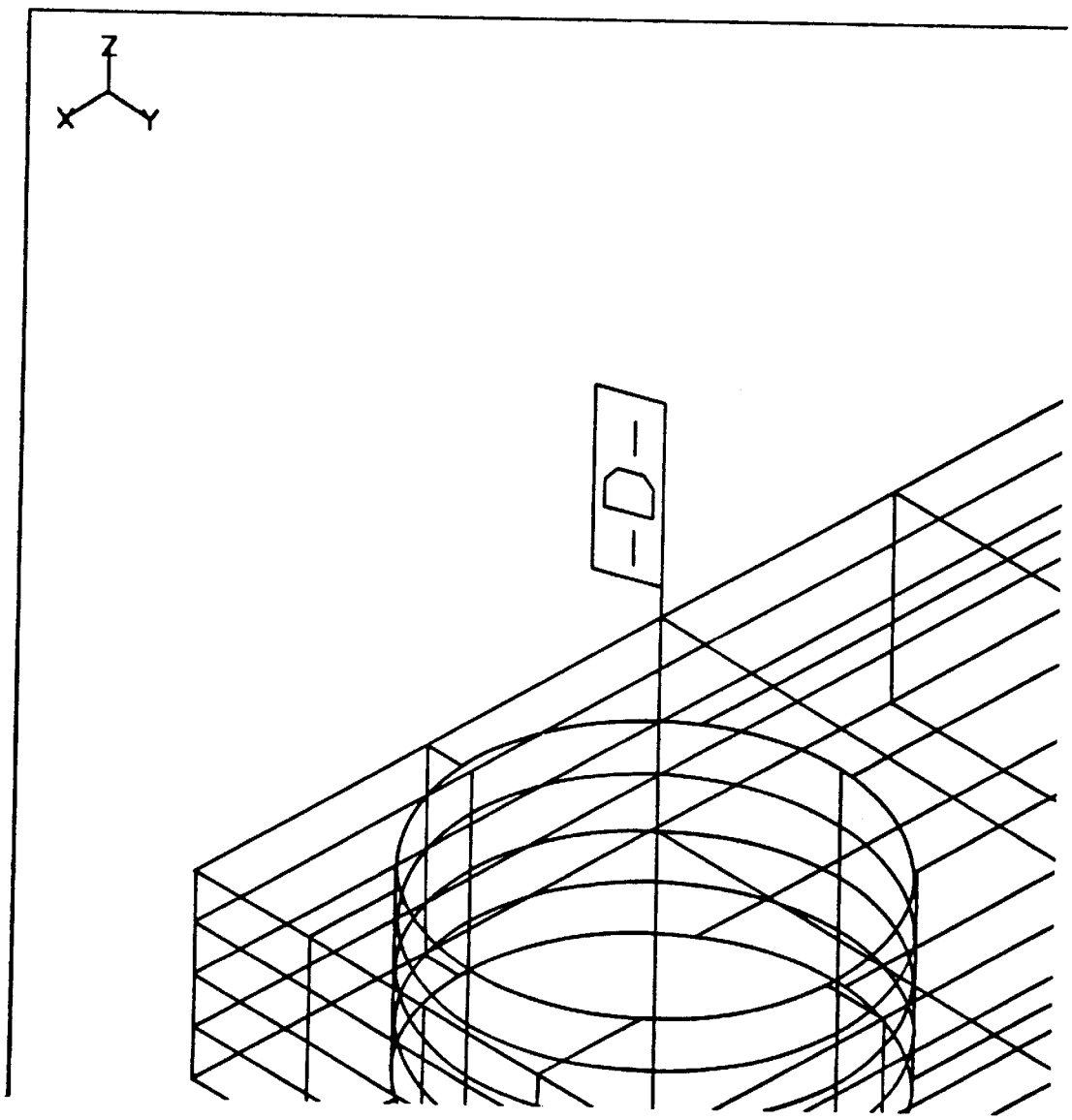
FIG. 3B1

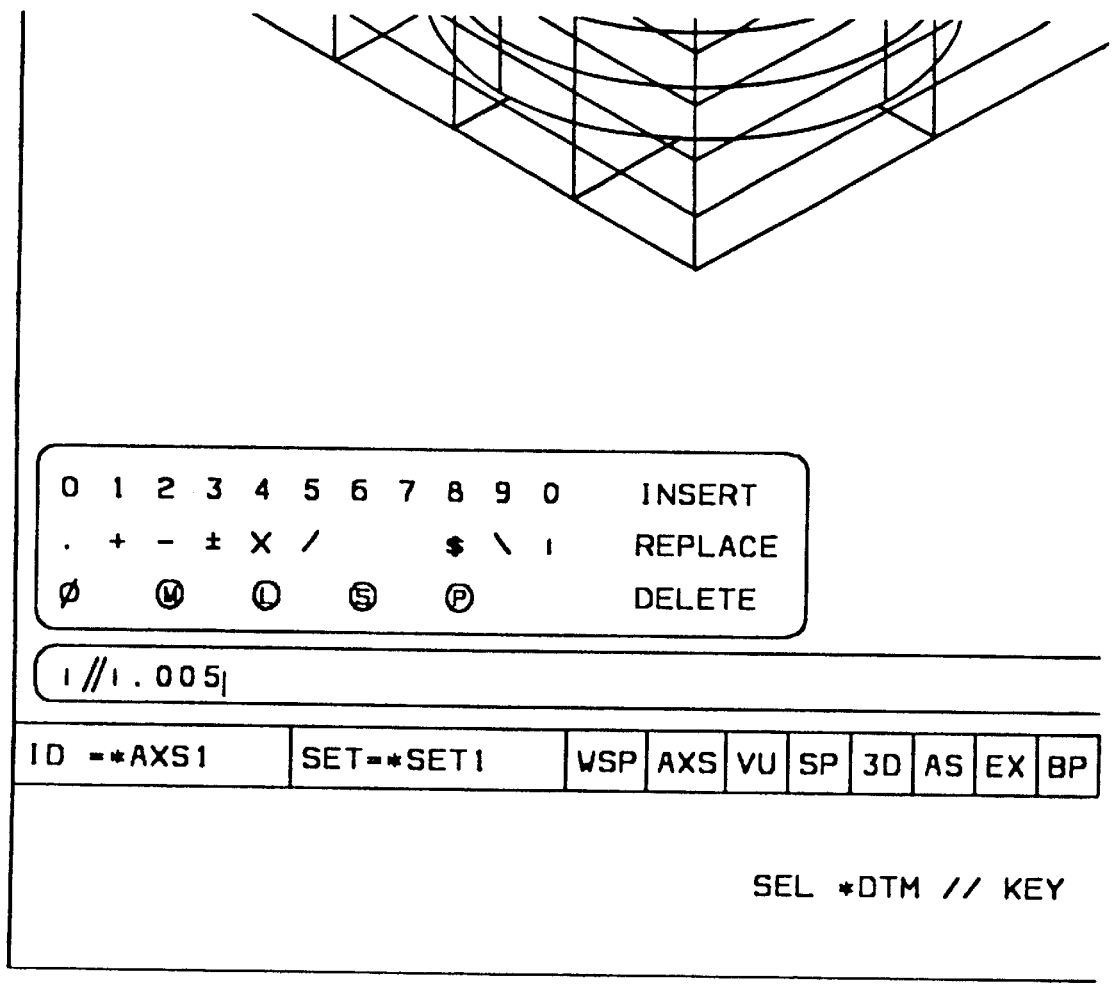
FIG. 3B3

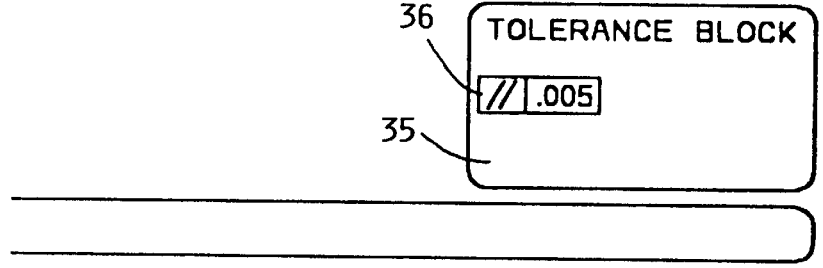
FIG. 3B4

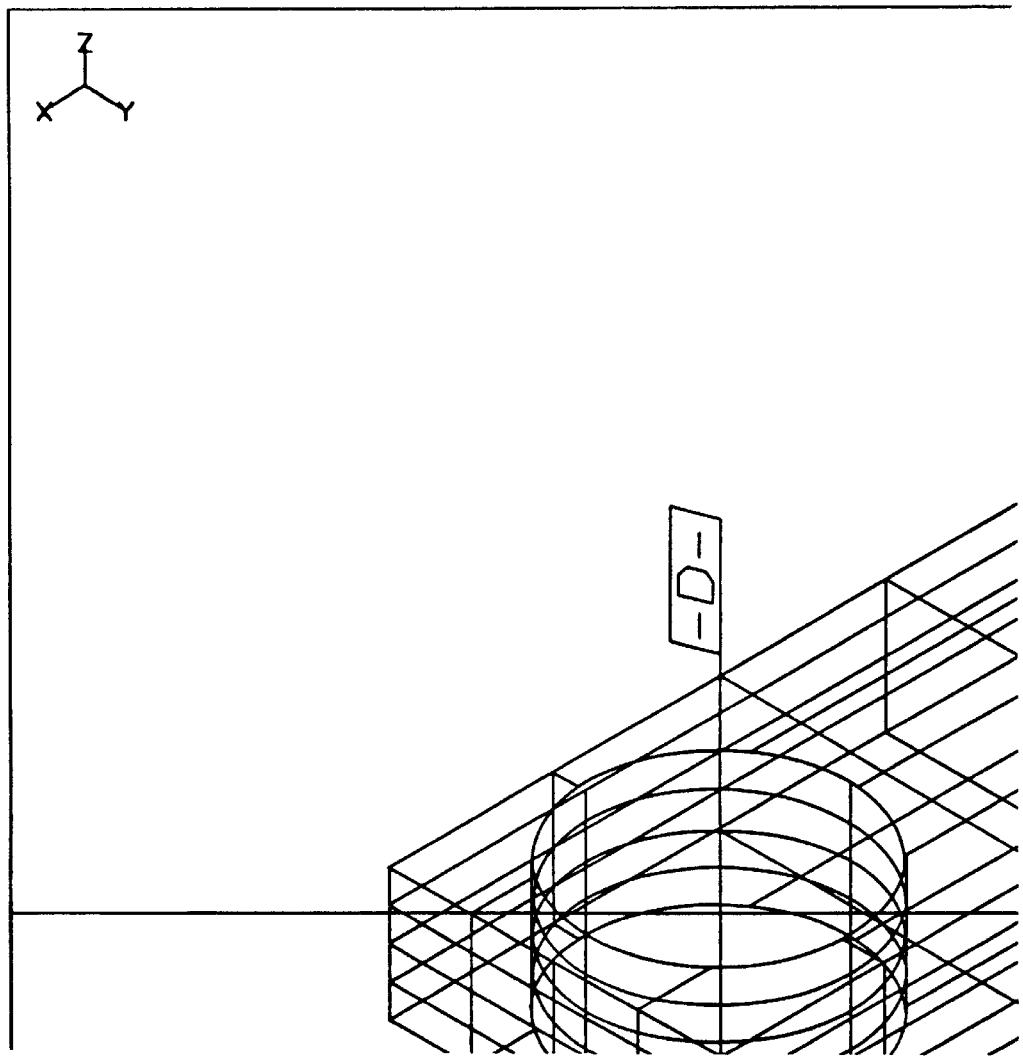
FIG. 3C1

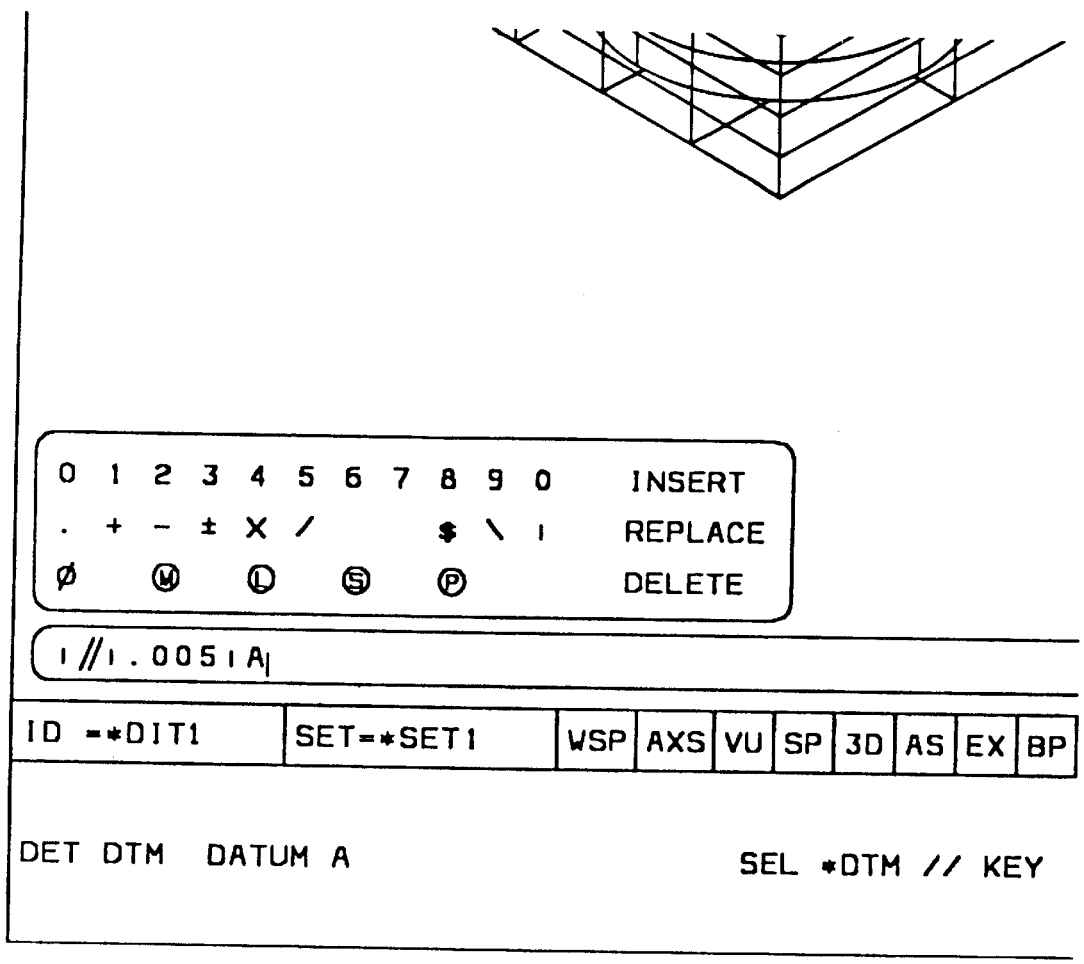
FIG. 3C3

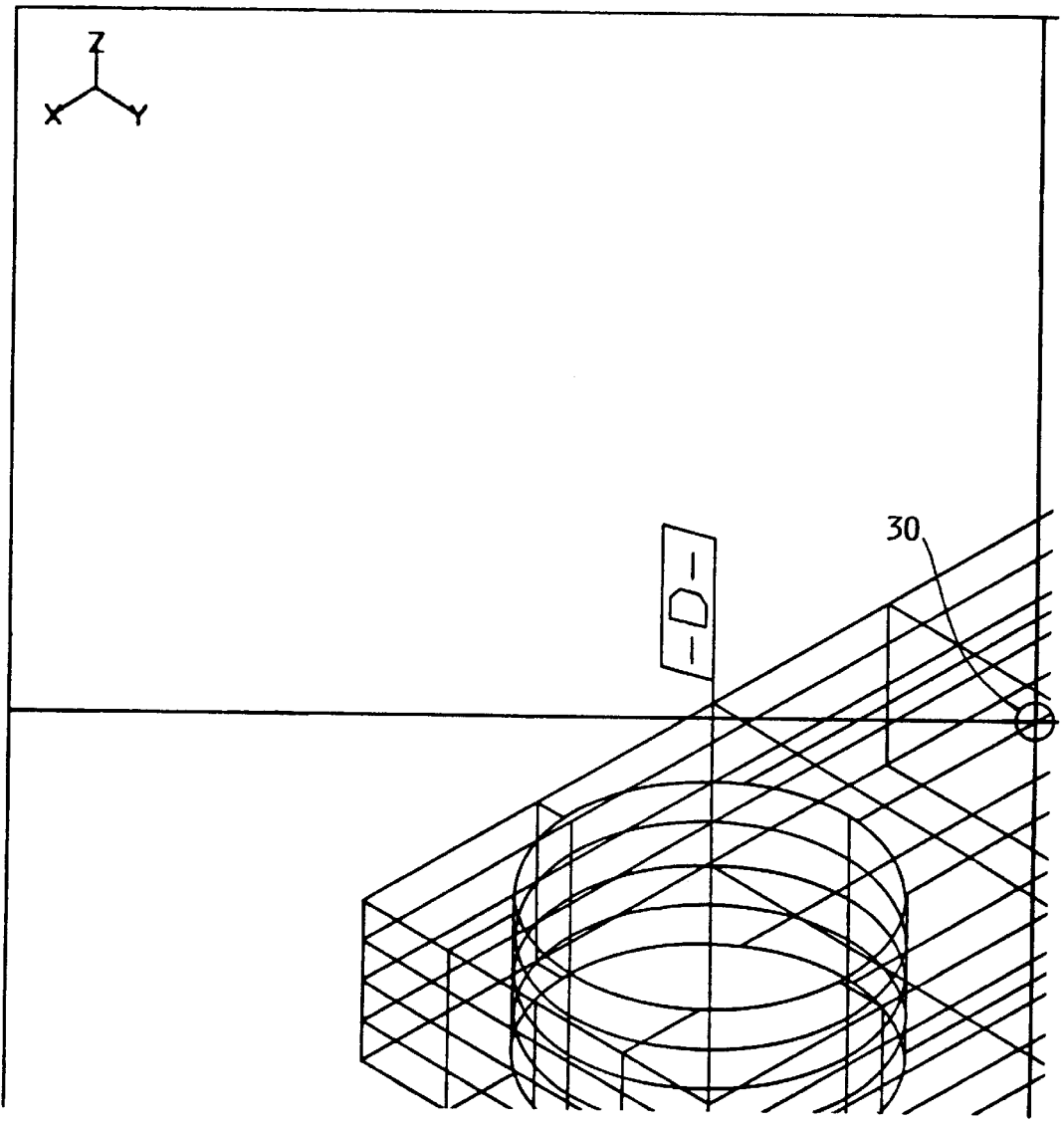
FIG. 3D1

METHOD AND APPARATUS FOR TOLERANCING THREE DIMENSIONAL DRAWINGS

This is a continuation of Ser. No. 07/559,004, filed Jul. 27, 1990, now abandoned.

BACKGROUND OF THE INVENTION

For many years final design parts for machines were drawn on paper in two dimensions. Depending on the complexity of the part, from one to several pages of two-dimensional drawings were completed to fully describe a part. To produce the finally designed part, an Engineer or a Machinist would read and interpret several pages of the two dimensional drawings and machine the part. Once machined, one of several processes could be used to mass produce the part. In essence, a critical portion of the design phase of a machine included the paper system of describing parts.

In recent years computer software and computer hardware has been developed which allow an Engineer or Draftsman to draw and design a part in three dimensions on a computer screen. This has eliminated much of the paper system and streamlined the design process overall. For example, now an Engineer or Designer can store the part in the memory of a computer or on a disk outside a computer. In addition, a designed part can also be sent electronically from one Engineer to another to see if certain design criteria are met or to approve a drawing. Also, a designer can spin the part on a computer screen to check the part from various angles which eases inspection of the drawings.

Most of the conventions for placing dimensions and tolerances on drawings were developed during the days when most parts were fully described using a two dimensional paper system. Many of these conventions are easily changed to accommodate the new three dimensional computer systems. Other conventions have been changed with some effort. An example of such a change in convention is described in U.S. Pat. No. 4,855,939 issued to Fitzgerald, Jr. et al. The change described in the Fitzgerald, Jr. et al. patent deals with dimension lines on the three dimensional figures. When a drawing is taken from two dimensions to three many times the lines used to indicate the ends of a particular dimension are confusing. Also, when a drawing is spun the dimension lines may be positioned awkwardly and without regard to the conventions. The Fitzgerald, Jr. et al. patent uses "dogleg extension lines" to prevent confusion and also uses computer software instructions to automatically correct the presentation of dimensions.

Still other conventions have not changed and continue to be applied in the same ways. One example of such a convention is known as geometric dimensioning and tolerancing. Geometric dimensioning and tolerancing is a set of symbols and procedures which are applied to a two dimensional drawing. Presently, applying the conventional geometric dimensioning and tolerances to a finally designed part on a computer system required the designer to convert the three dimensional part to two dimensional drawings. Datums were defined and the part was dimensioned and toleranced in two dimensions.

There are several problems with the present way in which the convention of geometric dimensioning and tolerances is applied to parts. For example, the part which has been toleranced and dimensioned in two dimensions is still subject to interpretation upon reading the paper prints of the part. Most notably datums which represent planes on a paper print may abut a line and a human being must interpret to which plane a particular datum applies. When a human is needed to interpret the prints, the process of making the part is much more prone to mistakes. Another problem related to human interpretation is that there is no way known for a computer to consistently construct the dimensions and the tolerancing for the part in three dimensions from the two dimensional drawings which require interpretation. Still a further problem is that the electronic three dimensional image is less useful when it does not have the capability of carrying the dimensions and tolerances with it. In order to build the part to specifications then the two dimensional counterpart must be referred to.

This lack of dimensions and tolerances on three dimensional computer drawings has implications to the future as well. One of the goals of the computer software and computer hardware is to allow the part to be manufactured directly from the final electronic three dimensional drawing of the part. This goal is not obtainable unless dimensions and tolerances can be electronically carried and shown with the part in a computer image. One example of how critical this carrying of dimensions and tolerances is to the goal of total automation concerns the fact that tolerances are very key to the manufacturing process. For example, if very small tolerances are required the manufacturing process may be entirely different than if a large tolerance is specified. The amount of tolerance specified will also dictate which machines can be used to make a part. For example, a certain manufacturing machine may be able to hold one half of the tolerance compared to another manufacturing machine. If a large tolerance is specified both machines may be able to be used in mass producing a part. On the other hand a smaller tolerance might only allow one of the machines to be used.

Therefore it is evident that there is a need for a method and apparatus to specify, change, and carry the geometric tolerancing data along with the designed part in three dimensions.

SUMMARY OF THE INVENTION

A method for placing tolerances on three dimensional objects so that the information can be electronically transferred along with the other data for a drawing in a computer aided design system is disclosed. Basically, a datum is selected and defined mathematically in three dimensional space. The datum is also shown on the computer screen with the aid of a datum symbol. A type of tolerance is selected, the numerical amount for the tolerance is input to the computer aided design system, the geometric elements of an object to which a particular tolerance are defined and then the defined datum to which the tolerance is referenced is selected. A number of datum linkage relationships are created to allow the computer aided drafting system to retrieve which datum symbol applies to which datum, and the mathematical description of the datum.

Advantageously, the datums and tolerances to which the datums refer, can now be electronically stored in the memory of a computer system along with the other data for a computer aided design drawing. This is a major step toward total machine automation. In addition, the tolerances specified by a designer are no longer subject to human interpretation and therefore the machining procedures will be much less prone to error. In addition, time will be saved since three dimensional drawings will not be have to be reduced to two dimensions in order to place the tolerances on the drawings. Now a designer is able to place the tolerances for a part directly on the three dimensional drawing which both saves time and reduces errors.

BRIEF DESCRIPTION OF THE DRAWINGS

For a better understanding of the present invention reference may be had to the accompanying drawings, in which.

These drawings are not intended as a definition of the invention but are provided solely for the purpose of illustrating the preferred embodiment of the invention described below.

DETAILED DESCRIPTION OF THE PREFERRED EMBODIMENT

Figure 1:
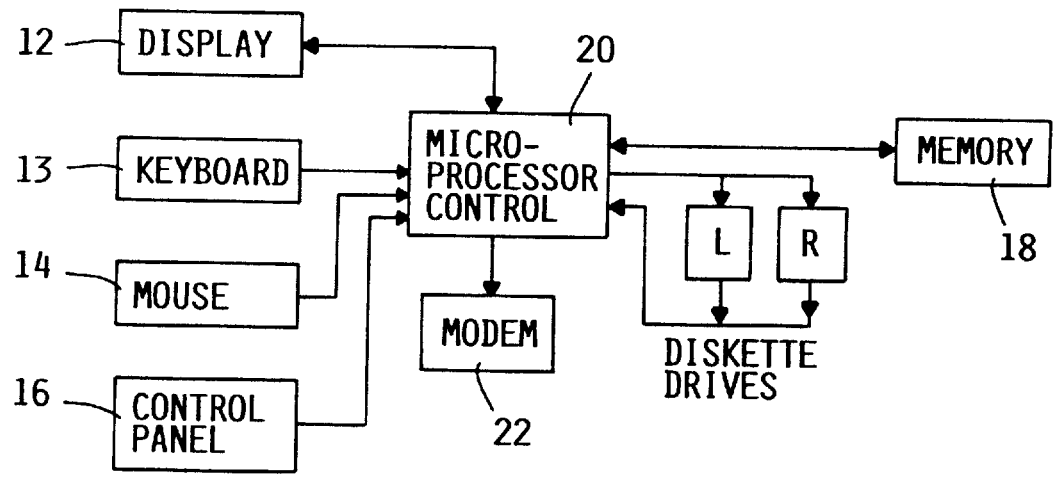
FIG. 1 is a block diagram of an interactive information handling system in which the method of the present invention may be advantageously employed.

FIG. 1 is a block diagram of an interactive information handling system 10, which is used to produce and modify three dimensional images. The information handling system 10 includes a video display terminal 12 for displaying information to an operator; a keyboard 13 and a mouse 14 for entering data to the information handling system 10; a control panel 16 which includes controls for rotating the image about various axes. The system 10 also includes a memory 18 for storing information and a microprocessor 20 which functions as the overall control for the system 10 and interrelates the various system components to perform their specific functions at the appropriate time. The system may also include a means for interconnecting one system to another system. Such a means may be a modem 22. In the information handling system 10 the modem 22 shown could be replaced with a set of buses to connect the information handling system to a mainframe. The information handling system 10 is the hardware that is used with a set of program instructions called software to form what is generally known as a computer aided design (CAD) system.

Figure 2:
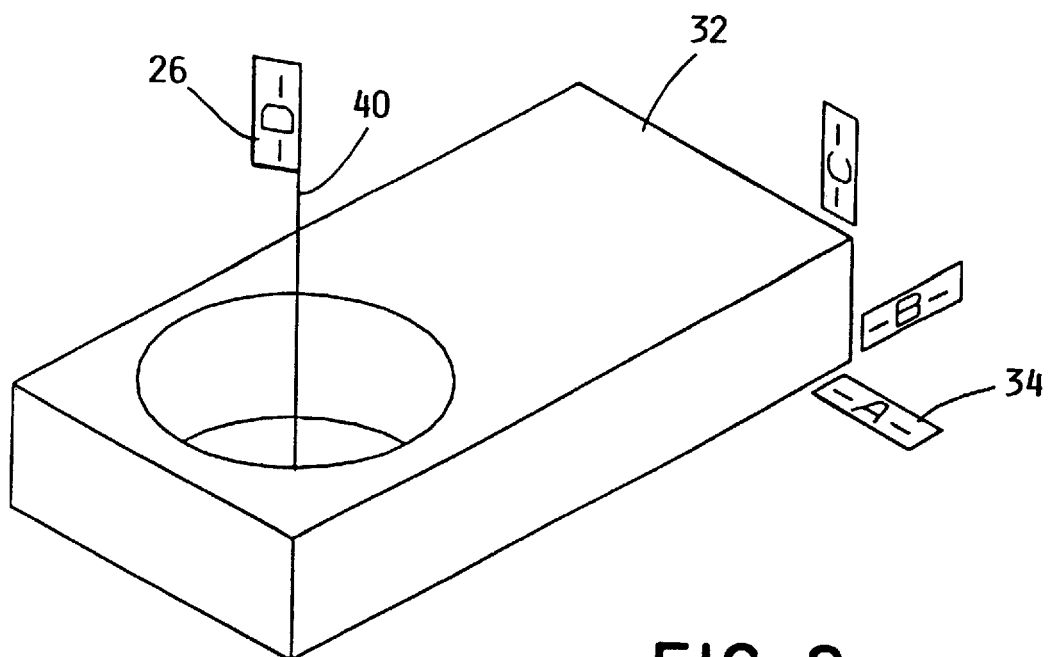
FIG. 2 is a depiction of a screen display showing datums in three dimensional space according to the invention.

One common use of graphics display systems in engineering is in computer aided drafting. FIG. 2 shows a display or screen of the video display terminal 12. Typically computer aided drafting systems are capable of drawing all of the traditional lines and shapes of manual drawing systems and operate under prompting and menu control. A screen cursor 30 (see FIGS. 3C and 3D) is used to designate coordinate data points and to interact with the drawing. Some computer aided drafting systems store standard shapes such as circles and rectangles. Shown in FIG. 2 is a wire frame view or wire frame model of an object 32. The wire frame view is a three dimensional view showing just the edges of the object 32. A typical computer aided drafting system also has the capability of producing two dimensional drawings as well. However, this invention deals mainly with three dimensional views on a computer aided drafting system.

The screen or display of the video display terminal 12 shown in FIG. 2 also shows a datum plane 34. The datum plane 34 is defined mathematically as are the other planes which comprise the wire frame model of the object 32. The datum plane 34 is depicted as a box or rectangle coplanar with the same plane in which the datum plane is defined. Depending on the view in a three dimensional perspective drawing, the box or rectangle actually may be depicted as a box or rectangle or a parallelogram. Inside the box or rectangle depicting the datum plane 34 is a letter "A" which is used to designate the datum plane 34 from other datum planes. Typically, the mathematical description of the datum plane corresponds to one of the planes defined by one of the planar edges of the object 32. In most instances three datum planes are defined, although there are drawings in which only one or two datum planes are defined. Typically, the other datum planes are orthogonal to the first datum plane and to each other. The other datum planes also are defined mathematically and are displayed as boxes in these planes with the letters "B" and "C". Of course it should be understood that other letters can be used to designate and reference these datum planes.

Also included in FIG. 2 is a centerline 40, which is defined by the axial center of the cylindrical opening in the object 32. It should be noted that a centerline may also be defined as the axial center or a cylinder or shaft as well as the cylindrical opening in an object. The centerline can be used to define a centerline datum in the same manner as a face can be used to define a planar datum. The centerline is also mathematically defined and referenced in the three dimensional system. As shown in FIG. 2, the centerline 40 has also been designated a datum. A datum symbol 26 is attached to the centerline 40 to designate that the centerline 40 has been designated a centerline datum. The datum symbol has one of its edges colinear with the ceniterline 40 and inside the box or rectangle which is part of the symbol 26 is the letter "D".

Advantageously, the datums, both plane datums and centerline datums, are mathematically defined and stored in the memory 18 of the information handling system 10. The datums are then defined and known to the computer aided drafting system until the datums are redefined. Once in memory 18, the data used to reference the plane datums and the centerline datums can also be transferred electronically with the other data of the drawings. In the past, computer aided drafting systems did not have this capability. Three dimensional drawings were reduced to two dimensional drawings and datums for a plane, for example, were actually written near a line in the two dimensional view. The datum would then have to be interpreted by a human since there was no way to describe its three dimensional location in the two dimensional drawing.

In use, first the designer uses a screen cursor 30 (shown in FIGS. 3C and 3D) to select a tolerance type from a number of choices available. One method of indicating the tolerance type is to use the standard Geometric Data & Tolerancing symbols as defined be ANSI Standard Number Y14.5M - 1982 ("GD&T Symbols"). After designating the particular tolerance type, the designer then enters the tolerance value over which the designated geometric element, such as a face or a centerline can vary. If a reference to a datum is desired, then the designer will select the datum or datums which are to be referenced. The next step is to select the various geometric elements to which the tolerance applies. For example, if the tolerance is for parallelism of a face to a planar datum, the designer will select parallelism from a menu of choices, then type a numerical value on the keyboard, then select a planar datum symbol and then selects the face to which the parallelism tolerance applies. The various tolerance relationships and datums to which they can be referenced is typically defined by the ANSI Standard Number Y14.5M - 1982 for Geometric Dimensioning and Tolerancing ("GD&T"). It should be noted that the order of these steps can vary depending on the type of computer aided design system and based on the software design and still be within the scope of this invention. The above described order is merely one way of designating a planar datum.

Similarly, the centerline datum is used during the design phase in mulch the same way as described above. The centerline datum is mathematically defined and stored in memory. The designer designates the particular geometry, such as a face or cylindrical opening, that will refer to the centerline datum for the tolerance, designates the type of tolerance, designates the allowable tolerance and the centerline datum which is referenced. For example, the cylindricity of an opening can be designated with respect to a centerline datum or the angularity of an opening can be designated with respect to a particular face of an object such as a wireframe model, volumetric model or a solid model. Other tolerances such as those designated by ANSI Standard Number Y14.5M - 1982 can also be designated with respect to a centerline datum. It should also be noted that the designer or operator designates the tolerances for geometric elements referring to a centerline datum following the same steps as described in the preceding paragraph.

Figure 3A:
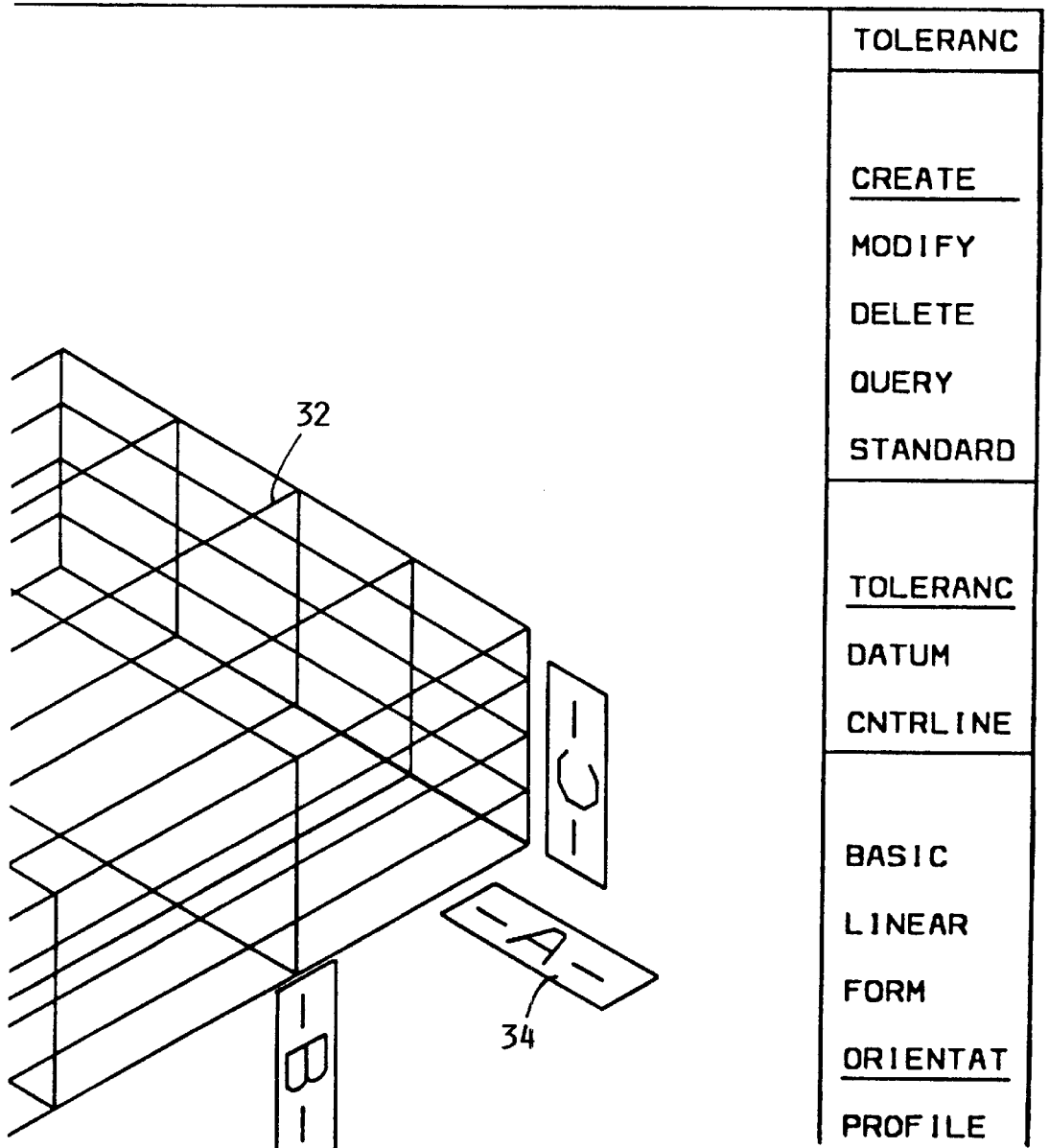
FIGS. 3A, 3B, 3C and 3D depict a series of screen displays showing an example of the user interface used to specify tolerances of various geometric objects with respect to a certain datum or datums.
Figure 3A:
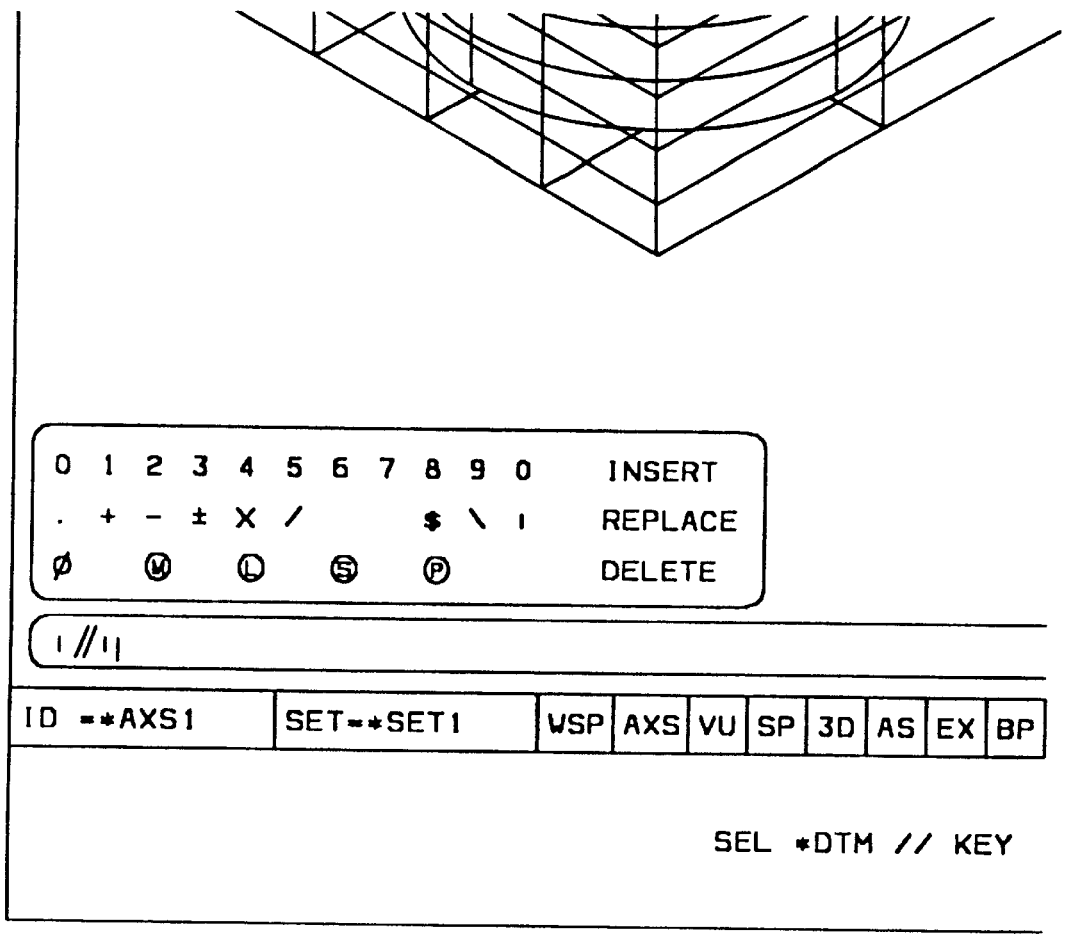
Figure 3A:
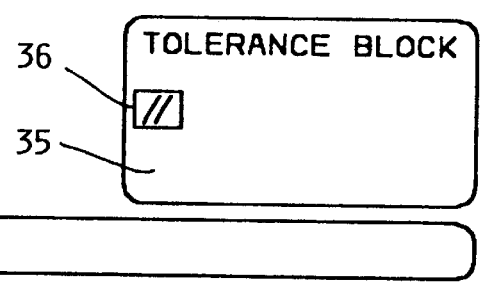
Figure 3B:
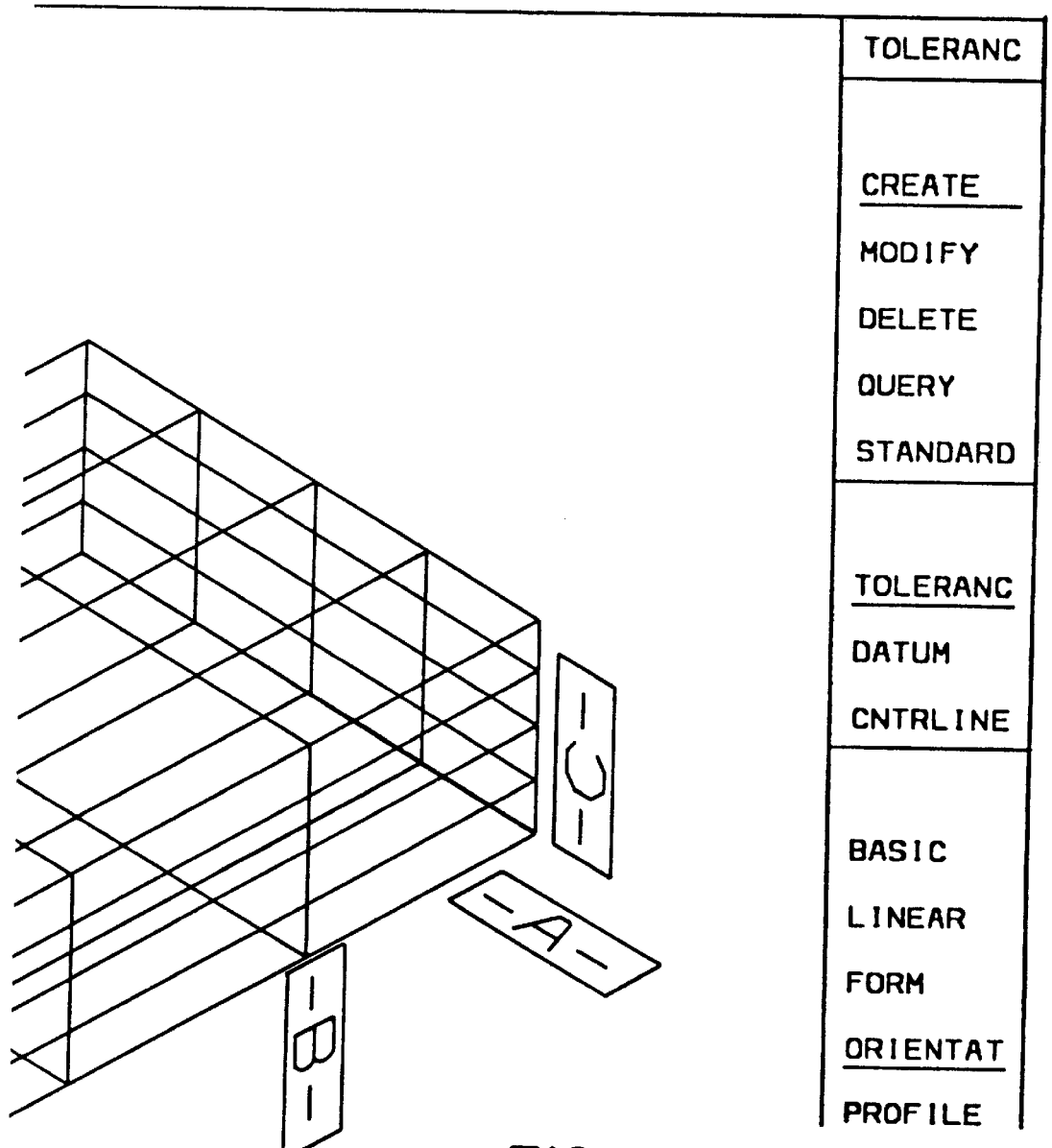
Figure 3C:
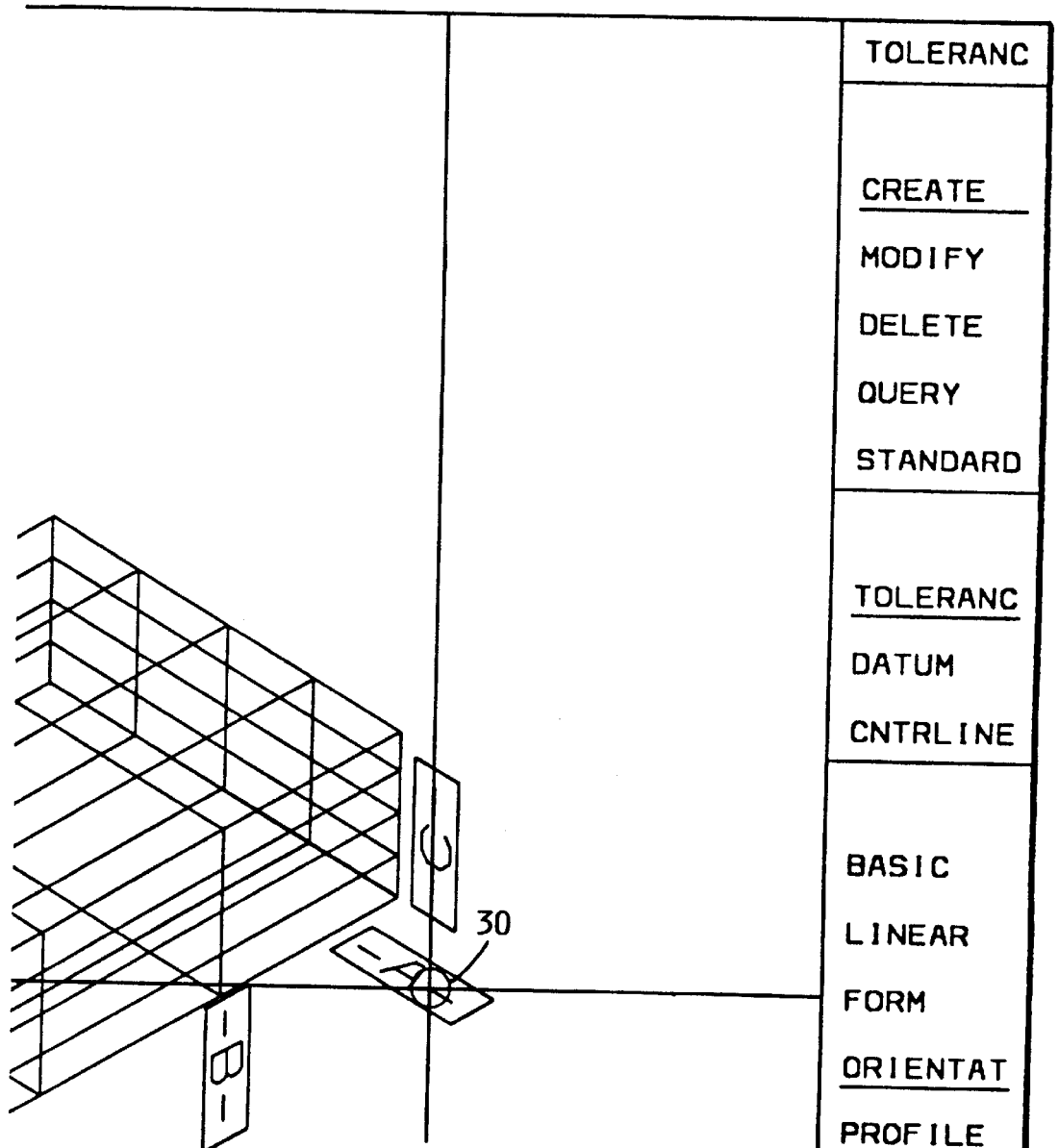
Figure 3C:
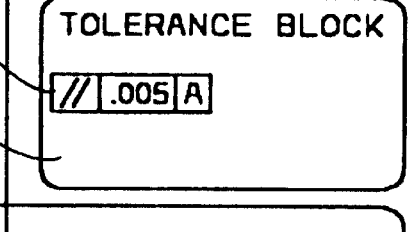
Figure 3D:
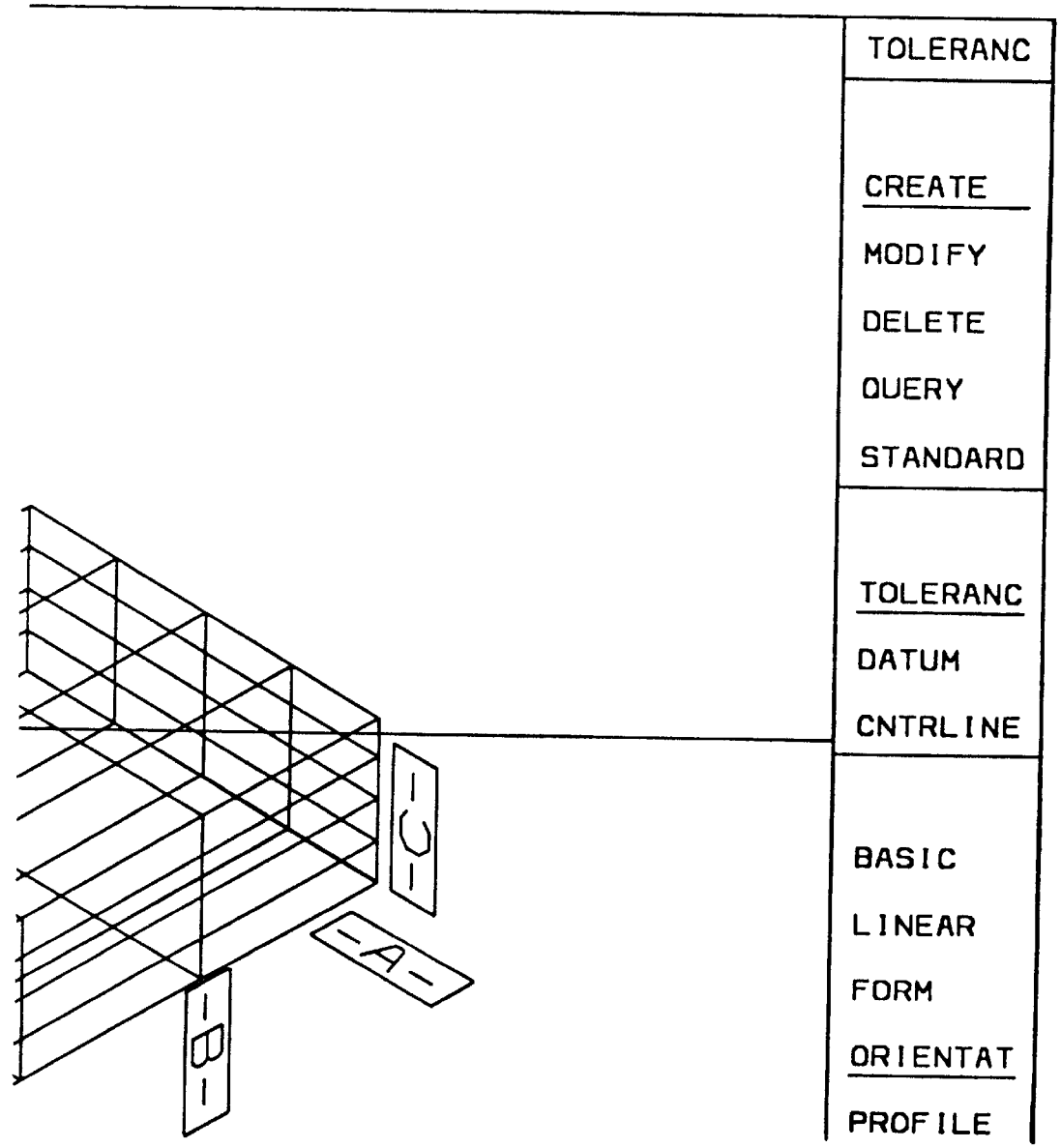
Figure 3D:
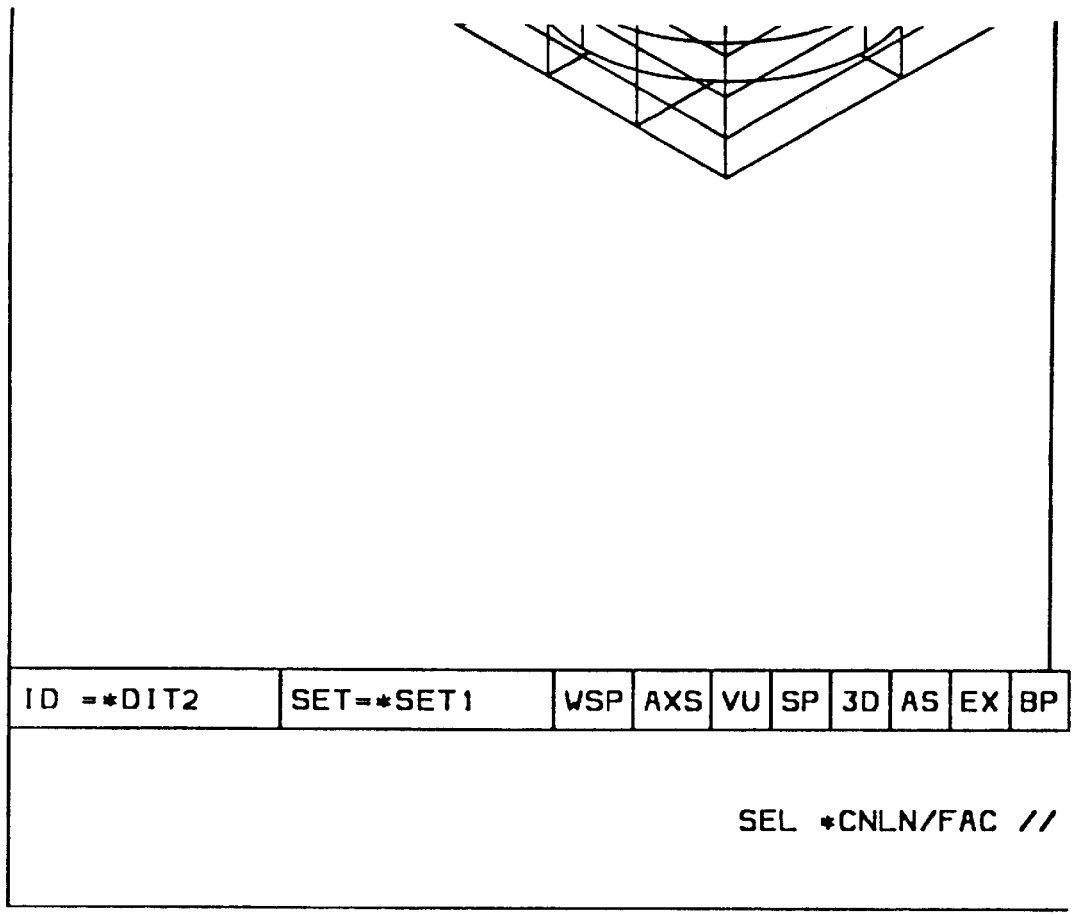
Figure 3D:
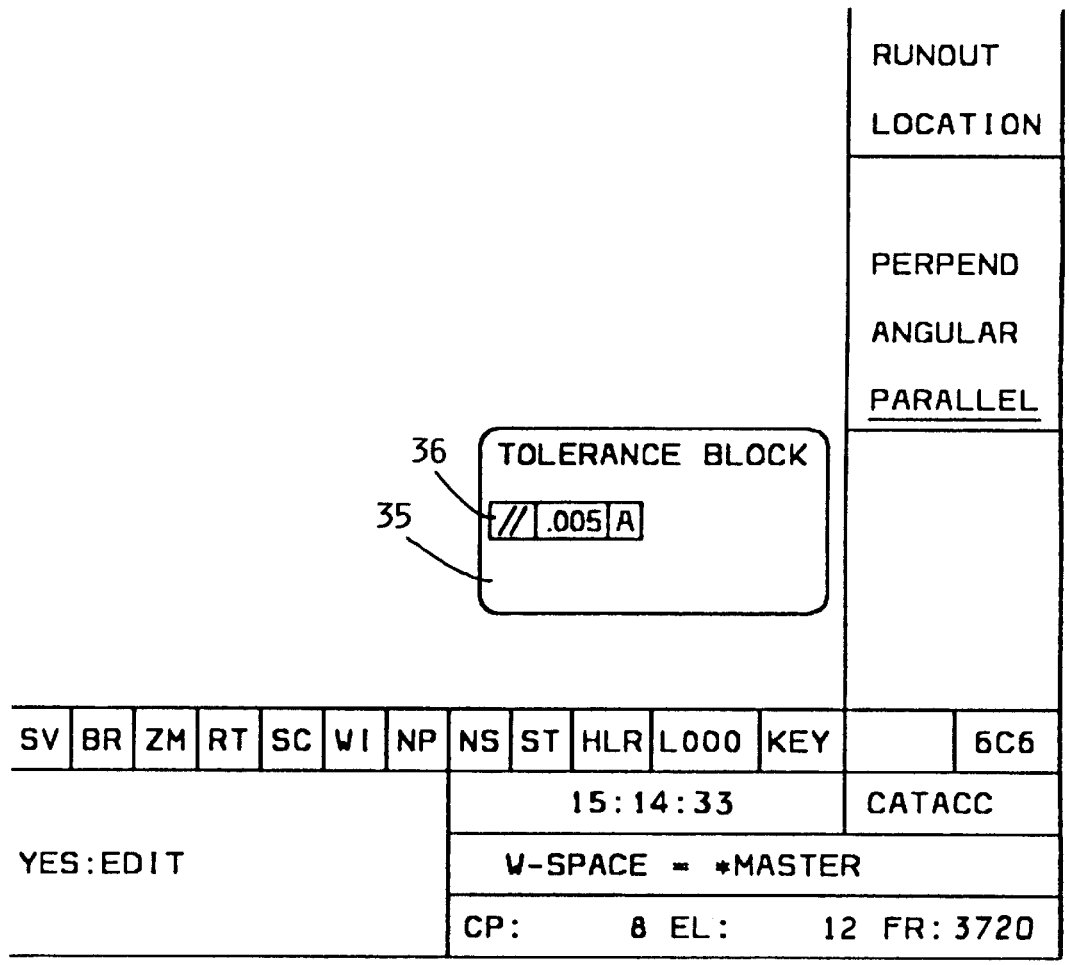

FIGS. 3A, 3B, 3C and 3D show an example of a series of screen displays which occur as a designer uses the computer aided drafting system. Each of the FIGS. 3A–3D includes the object 32 and has three datum planes A, B, and C. Also included in each of the Figures is a centerline 40 which has been designated centerline datum D. Also included on each of the Figures is a tolerance block 35 which is used to interface with the designer or operator of the computer aided drafting system. As shown in FIG. 3A, the designer has selected "parallel" as the tolerance type. A symbol 36 which indicates that the designer has selected parallelism appears in the tolerance block 35. FIG. 3B shows the screen after the designer has typed in the numerical value from the keyboard 13. The numerical amount then appears in the tolerance block adjacent the symbol 36 for the tolerance type. FIG. 3C shows the computer screen after the designer has selected the datum which will be referenced. In this particular instance the screen cursor 30, which appears as a circle at the intersection of two lines, is located on the datum A which was selected. The particular datum then appears in the tolerance block 35. In FIG. 3D, the designer or operator takes the next step of selecting the geometric element to which the tolerance applies. The screen cursor is moved using the mouse 14 to the particular geometric elements or elements to which the tolerance applies. In FIG. 3D, the mouse 14 has been used to position the screen cursor 30 on the plane to which the tolerance applies.

Figure 4:
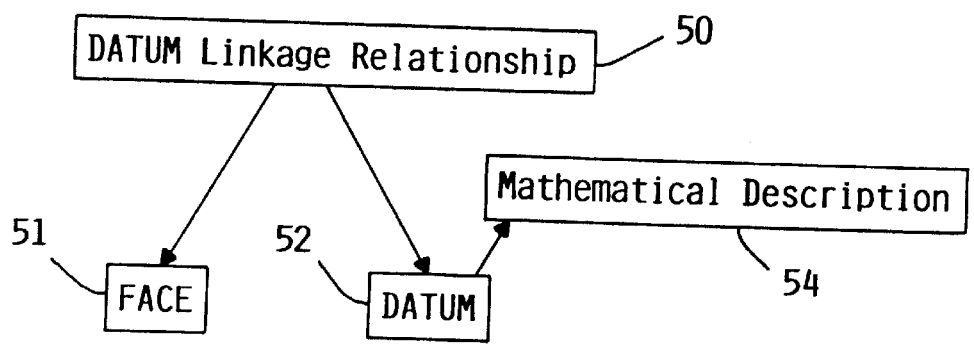
FIG. 4 shows the planar datum linkage relationship.

Within the information handling system 10 a number of linkage relationships are formed when the designer or user of the computer aided drafting system designates the datum, and the particular geometric body to which a tolerance applies. The linkage relationships are simply a set of pointers which link the data items. FIG. 4 shows such a linkage relationship for a plane datum. The datum linkage relationship is designated by reference numeral 50. The particular face from which the plane datum is defined is designated by box 51. The plane datum symbol is represented as box 52. A mathematical description of the plane datum is represented as box 54. A pointer points from the plane datum 52 to the mathematical description of the plane datum 54. A pointer also points from the datum linkage relationship 50 to the face 51; another pointer points from the datum linkage relationship 50 to the plane datum symbol 52. The datum linkage relationship which is formed thus allows the computer aided drafting system to access the datum symbol 52 and the face from which the datum is defined, for a particular linkage relationship.

Figure 5A:
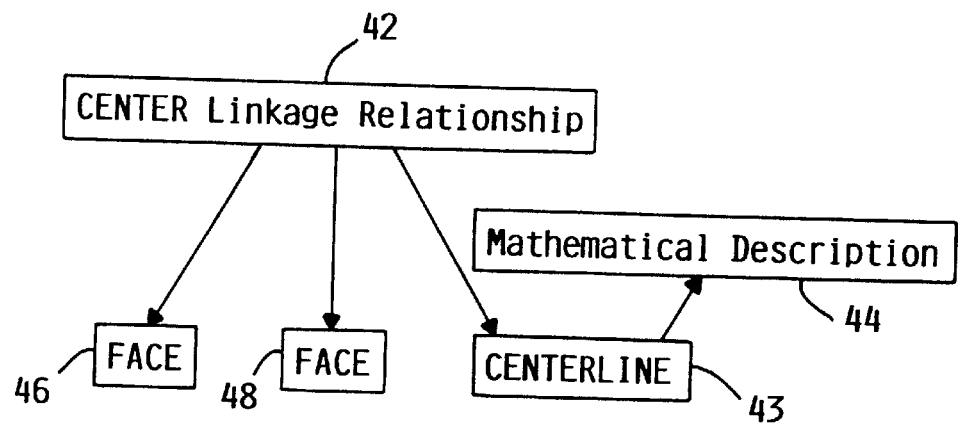
FIG. 5A shows the centerline linkage relationship.
Figure 5B:
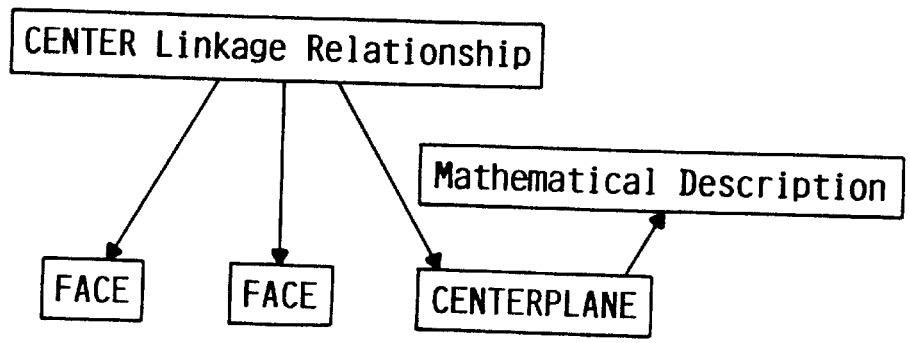
FIG. 5B shows the centerplane linkage relationship.
Figure 5C:
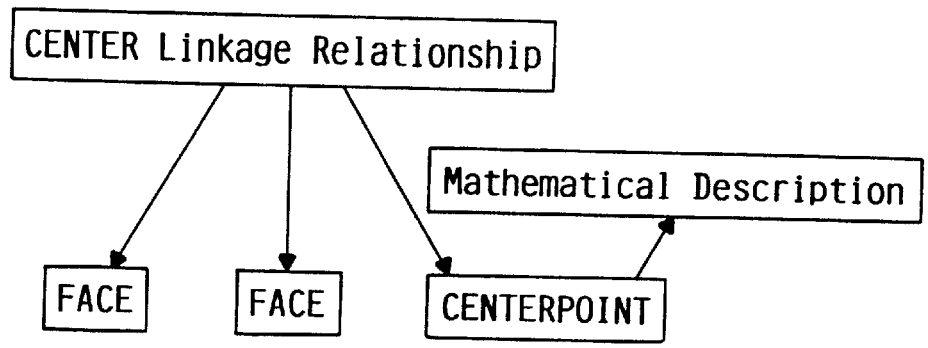
FIG. 5C shows the centerpoint linkage relationship.

FIGS. 5A, 5B and 5C show the various center relationship for centerlines, centerplanes and centerpoints. FIG. 5A shows a center linkage relationship for a centerline 40. The center linkage relationship is designated by reference numeral 42. Due to the mathematics in a computer aided design system two faces are sometimes used to define a centerline 40. Centerline linkage relationship 42 includes a centerline symbol 43 that has a mathematical description depicted by box 44 and a first face 46 and a second face 48. Pointers point from the centerline linkage relationship 42 to the first face 46, the second face 48 and the centerline symbol 43. Another pointer points from the centerline symbol 43 to the mathematical description 44 of the centerline symbol 43. The centerline linkage relationship formed allows the computer aided drafting system to access the particular faces 46, 48 to which the centerline is referenced for a particular linkage relationship. In addition, the centerline linkage relationship allows the computer aided drafting system to access the particular centerline 40 given the particular faces 46 and 48.

FIGS. 5B and 5C may similarly show the relationships for a centerplane and a centerpoint. Since the description would be so similar, FIGS. 5B and 5C will not be described in detail.

Figure 6:
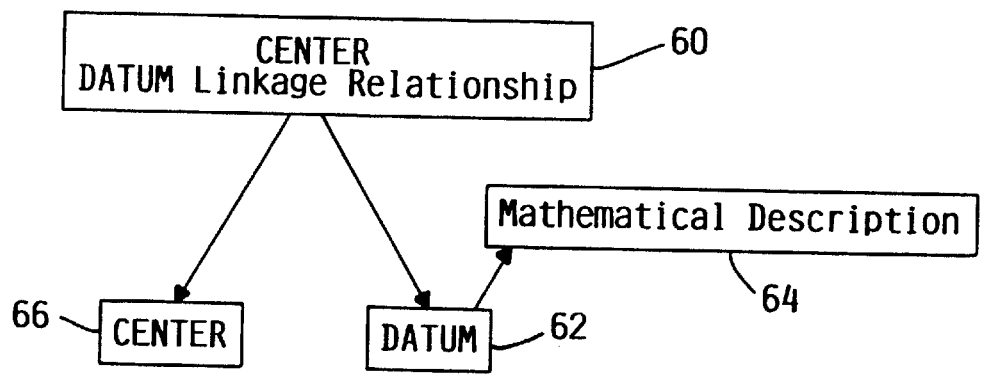
FIG. 6 shows the center datum linkage relationship.

Once a particular center is designated as a center datum, a center datum linkage relationship 60 as shown in FIG. 6 is created for the center datum. The center datum linkage relationship 60 includes a center datum symbol 62 that has a mathematical description depicted by box 64 and a center symbol which can include centerlines, centerplanes or centerpoints depicted by box 66. Pointers point from the center datum linkage relationship 60 to the center 66 and to the center datum symbol 62. Another pointer points from the center datum 62 to the mathematical description 64 of the center datum. It should be noted that a tolerance related to a center datum may be based on faces or other datums. The center datum linkage relationship formed allows the computer aided drafting system to access the particular center and the datum symbol 62 from which the center datum is defined, for a particular center datum linkage relationship.

Figure 7:
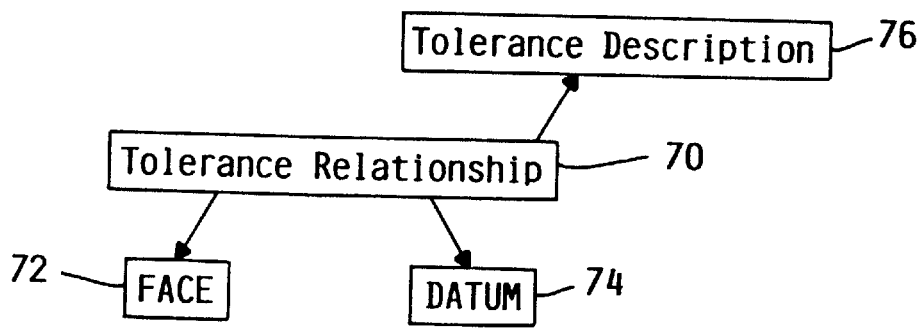
FIG. 7 shows the relationship of the type of tolerance to the geometric entity, such as a face, and the datum.

Stored with each of the relationships between datum entities, such as the center datum relationship 60 and the datum linkage relationship is the information related to dimensions and tolerances. The dimension and tolerance information can also be depicted as a relationship. The general form of a dimension and tolerance relationship is shown in FIG. 7. A tolerance relationship 70 is shown as an example. Included with the tolerance relationship 70 is a face 72 and a datum 74 and a tolerance description 76. The tolerance description 76 is the type of tolerance, such as flatness of a face. The tolerance description also includes the amount of tolerance that is specified with respect to a particular datum or other geometric element.

The present invention and the best mode for practicing it has been described. It is to be understood that the foregoing description is illustrative only and that other means and techniques can be employed without departing from the full scope of the invention described in the appended claims. It should also be understood that the invention described above can be used on all types of computer aided design systems which display all types of models including wireframe, solid and volumetric models.

Having thus described the invention, what is claimed as new and desired to secure by letters patent is:

1. A method for dimensioning and tolerancing an object which includes a plurality of geometric elements on a display screen of a computer, said computer having means for storing data, said object shown in three dimensional space and having a selected dimension which can vary by a selected tolerance, the method comprising the steps of:

defining a first datum mathematically in three dimensional space, thereby creating a mathematical description of the first datum;

labeling said first datum;

defining a face which is mathematically related to said first datum in three dimensional space;

selecting a type of tolerance between a geometric element of said object and a face; and selecting a tolerance;

storing the mathematical description of a first datum;

storing the type of tolerance and the selected tolerance; and linking the face, the mathematical description of the first datum, and the type of tolerance and selected tolerance in the storage means of the computer.

2. The method for dimensioning and tolerancing an object on a computer screen as defined in claim 1 further comprising the step of producing a symbol representing the first datum on the computer screen.

3. The method for dimensioning and tolerancing an object on a computer screen as defined in claim 2 wherein the step of defining a first datum includes defining a datum plane and the step of labeling said first datum includes the step of producing a rectangle or parallelogram coplanar with the designated datum plane in the three dimensional drawing of the object.

4. The method for dimensioning and tolerancing an object on a computer screen as defined in claim 2 wherein the step of defining a first datum includes defining a centerplane and the step of labeling said first datum includes the step of producing a rectangle or parallelogram coplanar with the designated datum for the centerplane in the three dimensional drawing of the object.

5. The method for dimensioning and tolerancing an object on a computer screen as defined in claim 2 wherein the step of defining a first datum includes defining a centerline and the step of labeling said first datum includes the step of producing a rectangle or parallelogram having one edge colinear with the defined datum for the centerline in the three dimensional drawing of the object.

6. A computer aided design system having a computer video display used in designing, dimensioning and placing tolerances on a three-dimensional object which includes a plurality of geometric portions, said computer display comprising:

means for selecting a first geometric portion of said plurality of geometric portions of said object;

means, coupled to said means for selecting a first geometric portion, for designating a datum corresponding to said first geometric portion;

means for selecting a second geometric portion of said plurality of geometric portions of said object; and means for defining a relationship between the datum and the second geometric portion of said object further comprising:

means for selecting a type of tolerance; and means for defining a numerical tolerance value, said type of tolerance and the numerical tolerance value defining the relationship between the datum and the second of said plurality of geometric portions.

7. The computer aided design system of claim 6 wherein the computer system comprises:

means for defining the designated datum mathematically; and means for storing the mathematical definition of the datum; and means for storing said selected type of tolerance and numerical tolerance value defining the relationship between datum and said other of said plurality of geometric portions of said object, wherein said means for storing said selected type of tolerance and numerical tolerance value stores said selected type of tolerance and numerical tolerance values in a linked relationship with said mathematical definition of the datum.

8. The computer display of claim 6 wherein the means for designating a datum includes a menu for creating and modifying datum.

9. The computer display of claim 8 wherein the means for designating a datum includes a menu for selecting the type of datum.

10. The computer display of claim 9 wherein the means for designating a datum includes means for defining a label for said datum.

11. The computer display of claim 6 wherein the means for selecting a type of tolerance includes a menu of various types of tolerances.

12. The computer display of claim 6 further comprising means for displaying the selected type of tolerance and displaying the numerical value which define the relationship between the datum and the other of said plurality of geometric portions after being selected.

13. A computer aided design system for use in designing a three-dimensional object, comprising:

display means for displaying on a computer display an axonometric representation of said three-dimensional object;

selection means interactive with said computer display for selecting one or more features of said three-dimensional object from said axonometric representation;

datum designation means coupled to said selection means for designating a datum corresponding to a first of said features selected by said selection means;

means coupled to said selection means for identifying a second of said features selected by said selection means as a feature to be related to said datum;

means for defining a geometric relationship between said datum and said second feature;

means for selecting a type of tolerance to be associated with said geometric relationship between said datum and said second feature;

means for specifying a tolerance value to be associated with said geometric relationship between said datum and said second feature; and means for storing data representing said datum, said second feature, said geometric relationship, said type of tolerance, and said tolerance value in said computer system, wherein said datum, said second feature, said geometric relationship, said type of tolerance and said tolerance value are linked in said storage means.

14. The computer aided design system of claim 13 wherein the datum designation means includes a menu for creating and modifying datum.

15. The computer aided design system of claim 14 wherein the datum designation means includes a menu for selecting a type of datum.

16. The computer aided design system of claim 14 wherein the datum designation means includes means for defining a label for said datum.

17. The computer aided design system of claim 13 wherein the means for selecting a type of tolerance includes a menu of various types of tolerances.

* * * * *